INVENTORS
EUGENE HINDIN
SEMOND LEVITT
BY ANDREW ABOLINS

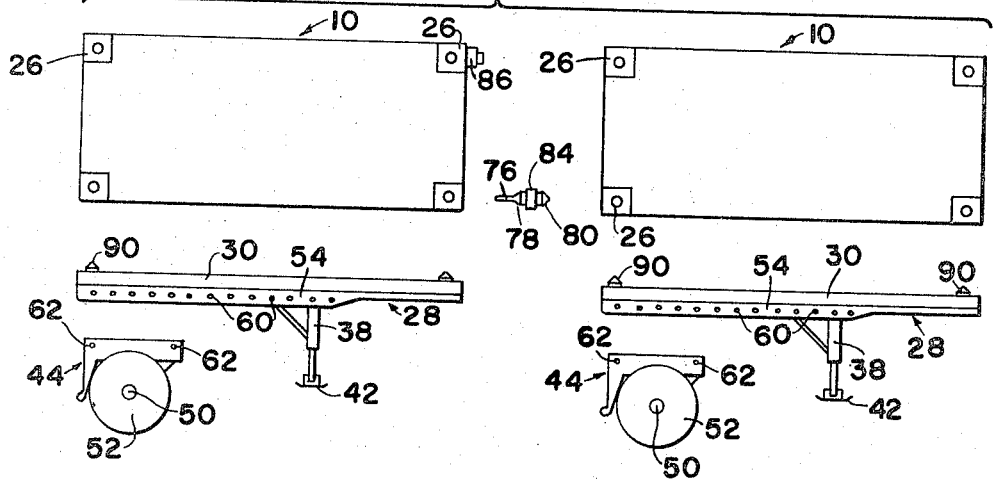
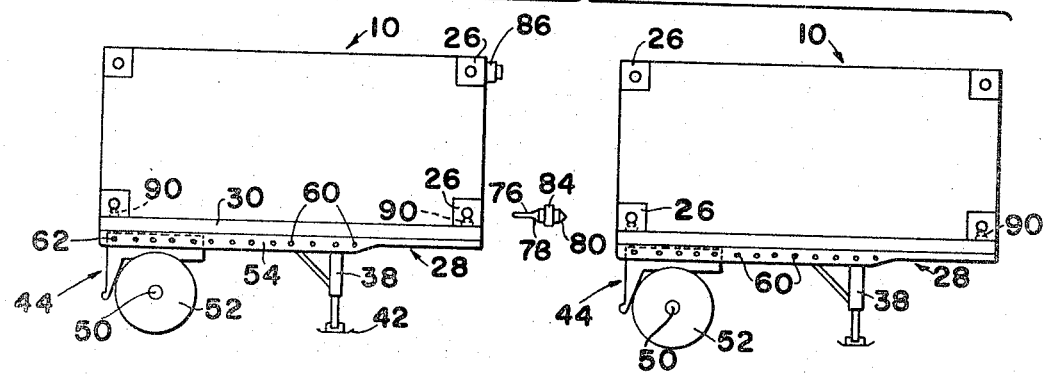
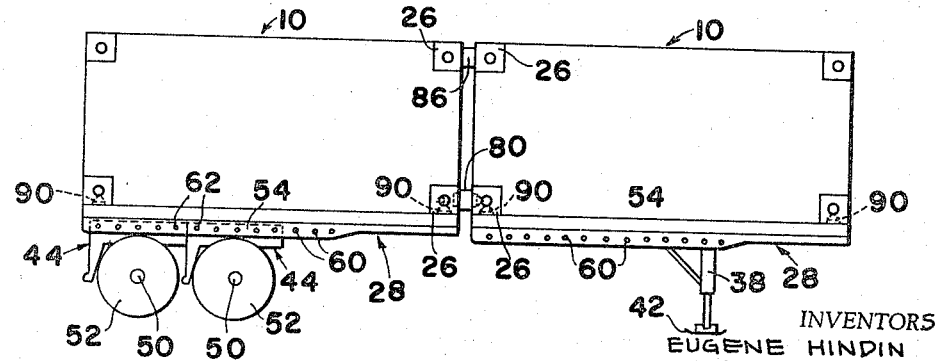

ATTORNEYS

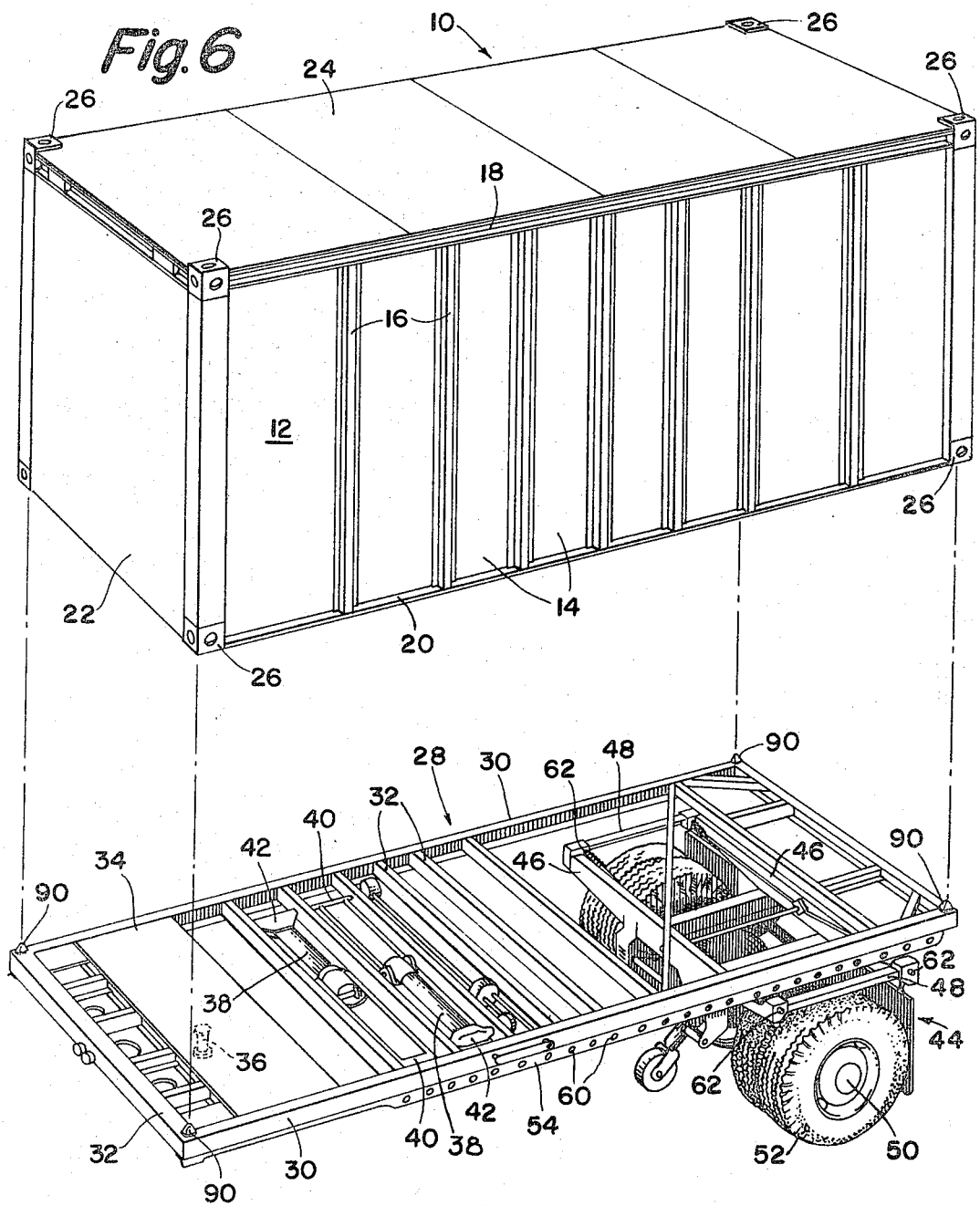

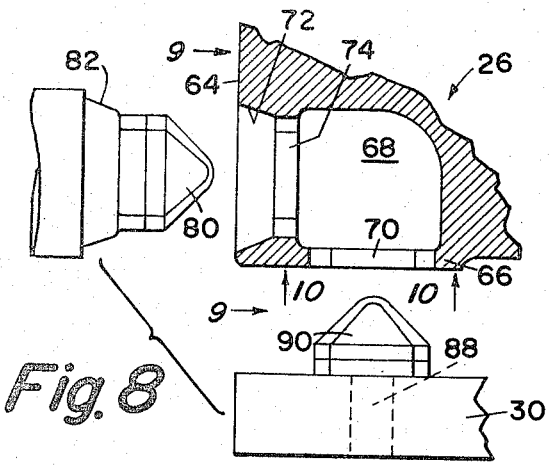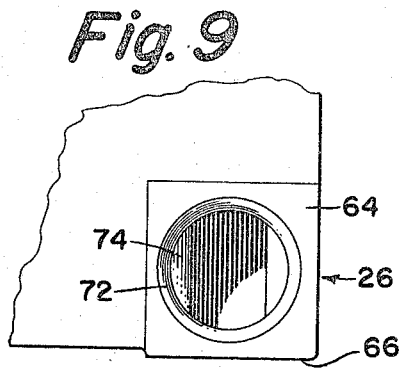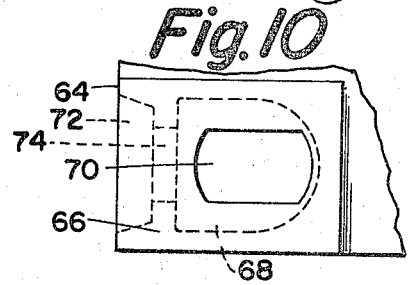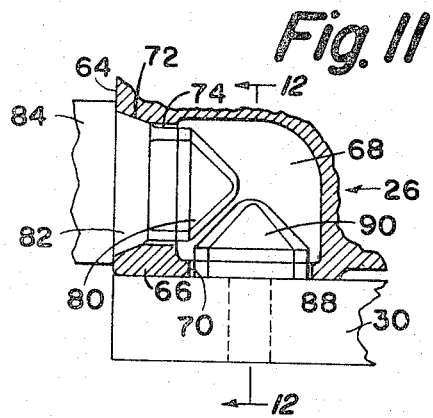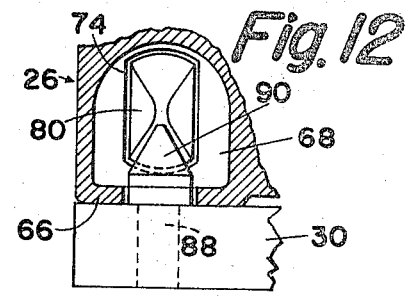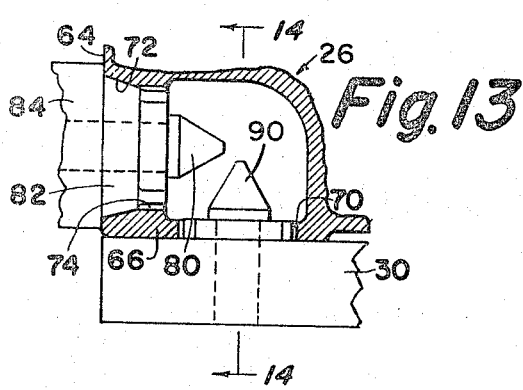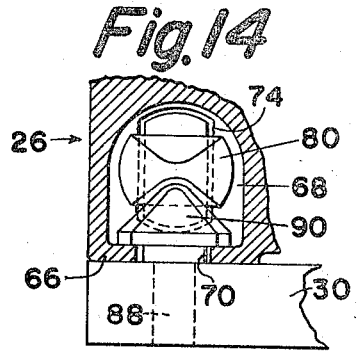

INVENTORS
EUGENE HINDIN
SEMOND LEVITT
BY ANDREW ABOLINS

Millman and Jacobs
ATTORNEYS

United States Patent Office 3,317,219
Patented May 2, 1967

3,317,219
VEHICLE FORMED BY COUPLEABLE CONTAINERS WITH DEMOUNTABLE ADAPTER FRAMES
Eugene Hindin, 6730 N. 13th St., Philadelphia, Pa. 19126; Semond Levitt, 1835 Lippincott Road, Huntingdon Valley, Pa. 19006; and Andrew Abolins, 431 Crescent Ave., Penndel, Pa. 19047
Filed June 4, 1965, Ser. No. 461,393
11 Claims. (Cl. 280—415)

This invention relates to unitary dual body, tandem axle service trailers which are convertible to separate single body, single axle, semi-trailers of the type described in Patent No. 3,004,772.

The primary object of this invention is to provide coupleable trailer bodies as described in the aforesaid patent employing means to couple the bodies horizontally and adapter or chassis frames which are detachably coupled vertically to the bodies and which mount the wheeled units or bogies, the kingpin and the landing gear. Thus, as an over-the-road vehicle, the same can be converted from separate single axle, single body units to a unitary dual body, tandem axle unit using the adapter frames and when, as in containerized cargo, it is necessary to transfer the bodies to a railroad flatcar, aboard ship or on a loading dock, the bodies can be readily removed from their adapter frames and either slid off or raised from the adapter frames, singly or coupled, leaving behind the adapter frames with the landing gears, kingpins and bogies attached thereto. In this manner, the carriers can carry larger payloads and the versatility of intermodal transfer is increased.

Another object of the invention is to provide coupleable containers with adapter frames in which the adapter frame is equipped with apertured longitudinal track angles and the wheeled units or bogies with releasable couplers to engage the tracks via the apertures so that the bogie can be guided in its movement from one adapter frame to another or in effect from one body to another during the operation in which the vehicles are converted from separate single axle, single body units to a unitary tandem axle unit and vice versa. Moreover, with the adapter frames attached to the bodies, the single or coupled bodies can be slid entirely off the bogies and onto a turntable on a railroad flatcar for transfer thereto, as shown and described in Patent No. 3,112,040.

Another object of the invention is to provide coupleable containers of the frameless or stressed skin type with means to removably couple the containers horizontally so that the connected containers act as a single beam and adapter frames having means to removably couple them vertically to the containers, the containers being constructed with corner members having recesses therein opening through horizontal and vertical walls of the corner members and the means to couple the containers horizontally and the adapter frames vertically to the containers being so constructed as to easily engage in or be disengaged from the corner members via the openings in the horizontal and vertical walls thereof, respectively. Thus, the coupling and uncoupling operations are simplified and since the coupling receptacles are confined to the corners the containers are provided with maximum cubage. Furthermore, with a stressed skin construction for the containers and a means to couple the containers horizontally to convert them to a single beam unit, the connected containers when removed from their adapter frames can be economically handled for transfer to ship, rail or loading platform without the need for heavy equipment which would contribute to the beam strength of the connected containers.

These and other objects of the invention will become more apparent as the following description proceeds in conjunction with the accompany drawings, wherein:

FIG. 1 is a group diagrammatic elevational view showing the containers, adapter frames, bogies and couplers in the about-to-couple position;

FIG. 2 is a view similar to FIG. 1 showing the adapter frames and bogies coupled to each other and to the containers which remain uncoupled;

FIG. 3 is a view similar to FIG. 2 showing the containers coupled as a unitary structure with both bogies beneath the rear container in tandem;

FIG. 6 is a group perspective view of each container, adapter frame and bogie;

FIG. 8 is a fragmentary enlarged group elevational view of the horizontal and vertical couplers with the corner member of the container to receive them shown in vertical section;

FIG. 9 is an end view of the corner member looking from 9—9 in FIG. 8;

FIG. 10 is a bottom view of the corner member looking from 10—10 in FIG. 8;

FIG. 11 is a view similar to FIG. 8 showing the couplers dispossed in the corner member but uncoupled therein;

FIG. 12 is a sectional view taken on the line 12—12 of FIG. 11;

FIG. 13 is a view similar to FIG. 11 showing the couplers in the corner member in the fully coupled position;

FIG. 14 is a sectional view taken on the line 14—14 of FIG. 13;

Specific reference is now made to the drawings in which similar reference characters are used for corresponding elements throughout.

Figure 4:
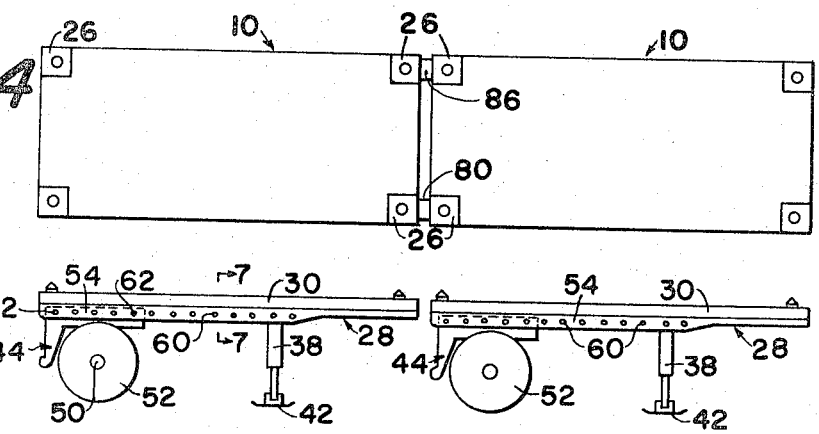
FIG. 4 is a view similar to the foregoing ones showing the coupled containers lifted from the adapter frames.

Referring first to FIG. 6, it will be seen that a container 10 is provided in the form preferably of a van size cargo or trailer body and of stressed skin construction whose sidewalls 12 consist of metallic sheets in the form of panels 14 which are secured to and between vertical posts 16 the function of which is to prevent buckling of the sidewalls. The panels and posts are secured by appropriate means to a top longitudinal rail 18 and a bottom longitudinal rail 20. This construction is continued for the end walls 22 except that the rear end wall (not shown fully) will contain the usual doors. To complete the container, which is preferably rectangular, a roof sheet 24 is secured to the top rails and cross sills (not shown) are connected across the bottom rails 20 upon which a floor (not shown) is installed. In this stressed skin construction, known in the trade as frameless, a load on the floor is taken by the sidewalls 12 and the sheets or skin 14 are an essential part of the load-carrying system.

Each corner has secured structurally into the container a member or casting 26 of a construction to be later described in detail. It is through these corner members that the containers are removably coupled horizontally or end to end and that the adapter frame or chasis 28 is coupled to the container.

As seen more clearly in FIG. 6, the adapter frame preferably runs the full length and width of the container and comprises longitudinal side beams 30 joined by cross members 32. Adjacent its front end the frame mounts a plate 34 having a depending kingpin 36. Immediately to the rear of the kingpin assembly are longitudinally staggered conventional supports or landing gears 38 which are hingedly connected at their upper ends as at 40 about longitudinal pins secured between adjacent cross members 32 so that the landing gears can be extended to vertical positions in which the feet 42 can engage the ground or can be folded to horizontal positions beneath the container and between the cross members, as seen in FIG. 6, so that the wheeled unit or bogie 44 can pass unobstructed from one adapter frame to the next, as will be described hereinafter.

The bogie 44 consists essentially of a frame having cross members 46 joined by longitudinal side members 48. The bogie frame flexibly mounts springs on both sides thereof (not shown) which centrally support a single transverse axle 50 which in turn mounts wheels 52 at its ends. The bogie is, of course, provided with a brake mechanism and hose connections to the emergency and service lines of the tractor, as is well known in the art.

Figure 7:
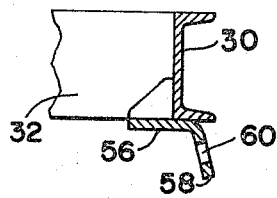
FIG. 7 is a sectional view taken on the line 7—7 of FIG. 4.

Affixed by welding or other suitable means to the bottom of side members 30 of the adapter frame and extending for a predetermined length to the rear of the adapter frame are track angles 54, each including a horizontally extending portion 56, see FIG. 7, and a vertically extending portion 58 at an angle of about 15° to the horizontal, the vertically extending portion including longitudinally spaced apertures 60 which are in transverse alignment with the apertures on the track angle on the other side of the adapter frame.

Each bogie is equipped with a releasable coupling mechanism of the type shown and described in Patents Nos. 3,004,772 and 2,831,700 consisting of crank-operated spring urged pins 62 which extend laterally through members adjacent the corners of the bogie frame. When the pins are released they extend as well through selected apertures 60 in the track angles 54 and thus couple the bogie to the adapter frame in adjusted positions. When the pins 62 are retracted, the bogie is free to slide beneath the adapter frame. It will be noted that widthwise the bogie frame extends beneath the cross members 32 of the adapter frame and between the vertical portions 58 of the track angle 54 and these portions 58 are outboard of the inner peripheries of the bogie wheels 52 to permit ease of shifting of the adapter frame and container coupled thereto relative to the bogies and to minimize canting due to shifting of loads in the container.

Coming now to the corner members 26, each is preferably a casting having at least a vertical wall 64, a horizontal wall 66 at its bottom substantially perpendicular thereto and an enlarged recess 68 therebehind. The bottom horizontal wall 66 includes an elongated slot 70 therethrough which communicates with the recess. The vertical wall 64 includes a tapered throat 72 opening through the wall which communicates with a reduced portion 74 of shape like that of slot 70 and communicative with the recess 68.

The means to couple the containers horizontally or end to end can be of the semi-automatic type shown and described in Patent No. 2,972,175 which is capable of transmitting very large tensional and shear forces from container to container. In general, such a coupler contains an elongated member or rod 76, and an enlarged tapered head 78 on the rod spaced from its free end and another complementary tapered head 80 at the other end, there being a filler member 82 associated with the head 80 whose outer contour conforms to the throat 72 and slot 74 in the vertical wall 64 of the corner member. A spring urged member 84 is interposed between the coupling heads which is rotatable therewith but slidable axially between them so that a force applied thereto in one direction will cause both heads to turn to the coupling position, as set forth in the aforesaid patent. These couplers are employed to connect the containers only at their lower confronting ends, as seen in FIGS. 1 and 2. For the upper corner members, units are used to take compression only and these are members 86 which can be inserted into the upper corner members through the throat 72 and slot 74 and turned manually to a coupled position. The other end may simply be tapered to conform to and fit into the throat 72 and slot 74 of an upper corner member of an adjoining container without being coupled thereto to transmit tension and shear forces. The coupling head 80 is conical with flat axial faces and its maximum cross-sectional area approximates that of the slot 74, so that when it is rotated to traverse the slot 74, as seen in FIG. 14, it will effect coupling.

The means to detachably couple the adapter frame 28 to each container consists of a rod 88 which is mounted in a suitable bearing or opening in the member 30 adjacent each corner of the frame for rotation about a vertical axis, the upper end of the rod mounting an enlarged tapered head 90 shaped similarly to that of horizontal coupler head 80. Its maximum cross-sectional area also approximates that of the slot 70 so that when it traverses the same coupling is effected between the adapter frame and the container.

Figure 15:
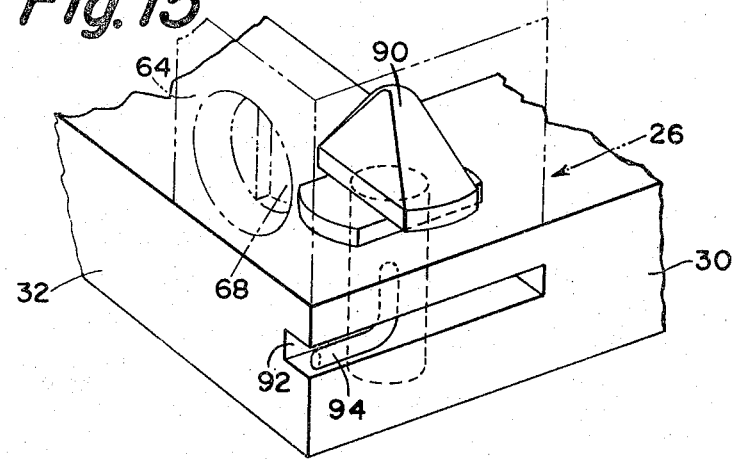
FIG. 15 is a fragmentary perspective view of one type of vertical coupler for removably attaching the adapter frame to the container.
Figure 16:
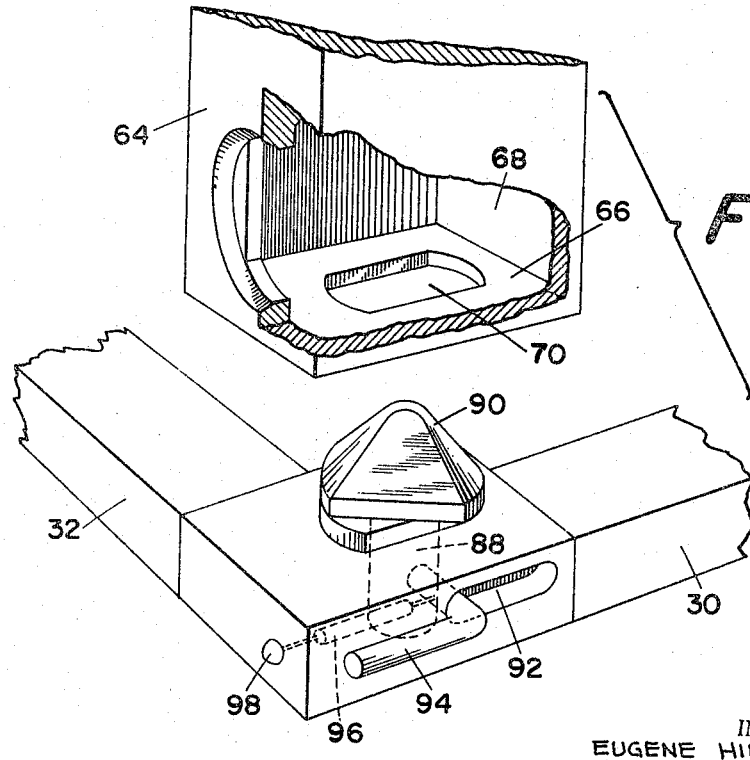
FIG. 16 is a group perspective view of a modified form of vertical coupler.

In the manual operation shown in FIG. 15, a slot 92 may be cut through the member 30 and an angulated handle 94 may extend therethrough and be connected to the rod 88 so that the head 90 can be rotated from a position of alignment with the slot 70 to the coupling position of traversal. In the automatic modification of FIG. 16, a spring 96 is terminally connected to the rod 88 and the member 30 as at 98, the spring acting to rotate the head 90 to an angulated traversal position, say 30° to the longitudinal axis of the slot 70. Thus, when the container is lowered onto the adapter frame, the slot 70 will strike the sloping faces of the head 90 and cause the same to rotate against action of the spring 96 until the head clears the slot 70 and enters the recess 68 whereupon it will snap back to its original position to effect coupling. A vertical coupler which can be used in this application is that shown and described in Patents Nos. 2,963,310 and 2,975,933.

In use, to obtain a single axle, single body vehicle, the bogie 44 is coupled in any desired position to the adapter frame 28 via the track angles 54 and the frame is then coupled beneath the container 10 via the vertical couplers 88, 90. A tractor can then be coupled to the kingpin 36 of the frame 28. To convert this to a unitary tandem axle semi-trailer, the horizontal couplers are placed in the lower corner members 26 of the front end of the rear body 10 by inserting the rods 76 through the corner members until their heads 78 are disposed in the recesses 68 where they are held in a horizontal position. The horizontal members 86 are connected into the corner members at the upper corners of the front end of the rear body. The front vehicle is then backed up until the upper corner members of the front vehicle engage the upper compression couplers 86 and the lower corner members of the front vehicle receive the heads 80 and fillers 82 of the lower horizontal couplers. Continued backing up movement will trip the member 84 and thereby cause both heads 78 and 80 to rotate to coupling positions in the recesses 68 of adjacent corner members of the bodies.

The shape and dimensions of the vertical and horizontal coupler heads and those of the slots 70 and 74 and recesses 68 are such that both coupler heads can readily enter the same corner member via the slots in the vertical and horizontal walls 64 and 66 and allow turning of the heads freely to the couple and uncoupled positions shown in FIGS. 11–14.

The bogie 44 associated with the front vehicle is uncoupled from the adapter frame, the brakes are applied thereto, the landing gears 38 of the rear vehicle are folded under the rear adapter frame and the coupled bodies and adapter frames pulled forward by a tractor until the front bogie is adjacent the rear bogie, at which point it is automatically or manually coupled to the track angles 54 of the rear adapter frame to provide the unitary dual body, tandem axle vehicle shown in FIG. 3. To convert back, the procedure is reversed. To prevent obstruction of the movement of the bogies from body to body, the kingpin 36 can be mounted for folding action around a transverse axis, as are the kingpins shown in Patent No. 3,004,772 or the kingpin can be rigid and cleared by a recess in the bogie frame.

Figure 5:
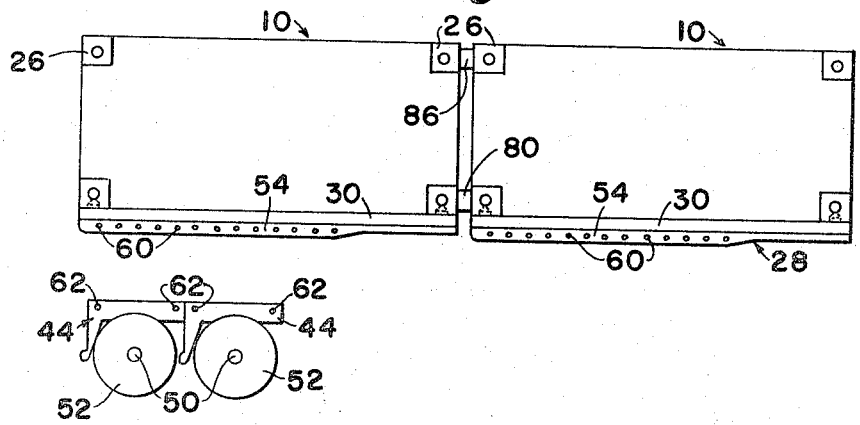
FIG. 5 is a view similar to FIG. 4 showing the containers coupled to each other and to the adapter frames but removed from the bogies.

Aside from its use as a tandem or single axle vehicle, the invention is versatile for intermodal transfer. Thus, with the adapter frames coupled to containers, the container and frame can be slid off the bogie and onto a railroad flatcar with a turntable equipped for coupling to the track angles of the adapter frame, as in Patent No. 3,112,040, and this can be done with a single container and frame or with containers coupled horizontally to each other and to the frames, as seen in FIG. 5. Also, the containers can be lifted by suitable cranes, singly or connected, as seen in FIG. 4, off their adapter frames and transferred as such to ships or loading platforms, in which case the bogies and adapter frames with their landing gears and kingpin assemblies are left behind for reuse with other containers while the containers are handled simply as cargo laden boxes. It will be understood that the means 86 to take compressive forces at the upper corners of the confronting ends of the containers plus the coupling means at the lower corners of the confronting ends of the containers act to transmit forces from container to container, minus the adapter frames, in magnitudes sufficient to make a single beam of the connected containers.

While preferred embodiments of the invention have been shown and described, it will be understood that skilled artisans can make variations, such as in the types of vertical and horizontal couplers, without departing from the invention as defined in the appended claims.

We claim:

1. A vehicle comprising a pair of freight-carrying substantially rectangular containers, upper and lower corner members in said containers, at least each of the lower members including a vertical and horizontal wall, a recess behind said walls and slots opening through said walls and communicating with said recess, an adapter frame substantially coextensive with each container, a single axle bodgie detachably coupled to said frame for sliding movement longitudinally thereof, landing gears, operatively connected to said frames for movement to positions which do not obstruct movement of said bogie along the frame, means extending removably through said slots in said vertical walls and into said recesses of the lower corner members of the confronting ends of said containers removably coupling said containers horizontally, and means carried by said adapter frames and extending removably through said slots in said horizontal walls of said lower corner members and into said recesses removably coupling said adapter frames vertically to said containers.

2. The combination of claim 1 wherein said containers are of stressed-skin construction.

3. The combination of claim 2 and means interposed between the upper corner members of the confronting ends of said containers to take compressive forces, said means removably coupling said containers at their confronting lower ends and said means to take compressive forces at the confronting upper ends combining to transmit forces from container to container in magnitudes sufficient to make a single beam of the connected containers.

4. A vehicle comprising a pair of substantially rectangular freight-carrying containers, means removably coupling said containers horizontally, adapter frames including interconnected longitudinal side members and spaced cross members, landing gears so connected to said adapter frames as to be movable to positions within the confines of said cross members, means removably coupling said adapter frames vertically to said containers, single axle wheeled bogies, and means removably coupling each of said bogies beneath an adapter frame, said means including guide tracks secured to the longitudinal side members of said adapter frame, each guide track being an angulated member having a depending apertured flange and retractable coupler pins carried by said bogie and adapted to engage said apertured flange, said bogie including a frame extending slidably beneath said adapter frame and between said apertured flanges.

5. The combination of claim 4 wherein said apertured flanges extend at an outward angle from said longitudinal side members of said adapter frames and are outboard of the inner peripheries of the bogie wheels.

6. The combination of claim 5 wherein said containers include upper and lower corner members, the lower ones each having vertical and horizontal walls with elongated slots therethrough and a recess therebehind, said means coupling said adapter frames vertically to said containers including upstanding rods rotatably mounted on each adapter frame having enlarged heads approximating the size and contour of said slots in said horizontal walls extending therethrough and into said recesses and traversing said slots.

7. The combination of claim 6 wherein said means removably coupling said containers horizontally includes elongated members with spaced enlarged heads approximating the size and contour of said slots in said vertical walls and extending through said slots and into said recesses of at least the lower corner members of the confronting ends of said containers and traversing said slots.

8. The combination of claim 7 wherein said heads of said horizontal and vertical couplers are of such shape and size relative to a recess in a corner member receiving them that they can enter the same recess and be rotated therein to the coupled and uncoupled positions without obstruction.

9. The combination of claim 8 wherein said containers are of stressed-skin construction and said horizontal coupling means transmits forces from container to container in magnitudes sufficient to make a single beam of the connected containers.

10. A vehicle comprising a pair of substantially rectangular freight-carrying containers, means removably coupling said containers horizontally, adapter frames including interconnected longitudinal side members and spaced cross members, landing gears so connected to said adapter frames as to be movable to positions within the confines of said cross members, means removably coupling said adapter frames vertically to said containers, single axle wheeled bogies, means removably coupling each of said bogies beneath an adapter frame, and means to guide the longitudinal movement of a bogie along said adapter when it is uncoupled therefrom.

11. A vehicle comprising a freight-carrying substantially rectangular container, members at least at the lower corners thereof each including horizontal and vertical walls, elongated slots through said walls and a recess behind said walls communicating with said slots, and adapter frame substantially coextensive with said container, a wheeled unit, means detachably coupling said wheel unit to said frame for sliding movement longitudinally thereof, landing gears operatively connected to said frame for movement to positions which do not obstruct movement of said wheeled unit along said frame, upstanding members rotatably mounted on said adapter frame including heads approximating the size and shape of said horizontal wall slots, so that coupling said adapter frame to said container can be effected by aligning said heads with said horizontal wall slots, passing said heads through said horizontal wall slots and into said recesses and rotating said heads until they traverse said horizontal wall slots, said vertical wall slots being adapted to removably receive headed members carried by a similar container so that said container can be detachably coupled horizontally to the similar container.

References Cited by the Examiner

UNITED STATES PATENTS

| | | | |
|---|---|---|---|
| 2,975,933 | 3/1961 | Abolins | 220—69 |
| 3,004,772 | 10/1961 | Bohlen et al. | 280—415 |
| 3,027,025 | 3/1962 | Tantlinger | 214—38 |
| 3,028,024 | 4/1962 | Black | 214—38 |
| 3,081,120 | 3/1963 | Heinmiller | 294—67 |
| 3,102,738 | 9/1963 | De Roshia | 280—415 |
| 3,111,341 | 11/1963 | Fujioka et al. | 296—35 |

LEO FRIAGLIA, *Primary Examiner.*